United States Patent
Ott et al.

(10) Patent No.: US 10,267,661 B2
(45) Date of Patent: Apr. 23, 2019

(54) ENERGY EFFICIENT MOBILE CONTEXT COLLECTION

(71) Applicant: Incoming Pty Ltd, Eveleigh, NSW (AU)

(72) Inventors: Maximilian Ott, Eveleigh (AU); Lars Henrik Petander, Eveleigh (AU)

(73) Assignee: INCOMING PTY LTD, Eveleigh, New South Wales (AU)

( * ) Notice: Subject to any disclaimer, the term of this patent is extended or adjusted under 35 U.S.C. 154(b) by 372 days.

(21) Appl. No.: 14/666,032

(22) Filed: Mar. 23, 2015

(65) Prior Publication Data

US 2016/0282156 A1 Sep. 29, 2016

(51) Int. Cl.
*G01D 18/00* (2006.01)
*H04W 4/02* (2018.01)

(52) U.S. Cl.
CPC .............. *G01D 18/00* (2013.01); *H04W 4/02* (2013.01)

(58) Field of Classification Search
CPC ....................................................... G01D 18/00
USPC ........................................................ 702/188
See application file for complete search history.

(56) References Cited

U.S. PATENT DOCUMENTS

| | | | |
|---|---|---|---|
| 2008/0005381 A1 | 1/2008 | Theocharous et al. | |
| 2011/0238379 A1 | 9/2011 | Misra et al. | |
| 2011/0313953 A1 | 12/2011 | Lane et al. | |
| 2012/0203491 A1* | 8/2012 | Sun | G06F 19/3406 702/108 |
| 2013/0159237 A1* | 6/2013 | Nath | G06N 5/025 706/47 |
| 2014/0074483 A1* | 3/2014 | van Os | G10L 15/22 704/275 |
| 2014/0245033 A1* | 8/2014 | Grokop | G06F 1/3206 713/300 |
| 2015/0312404 A1* | 10/2015 | Abramson | H04W 4/027 455/418 |
| 2015/0321903 A1* | 11/2015 | Lloyd | B81C 1/0023 702/189 |
| 2016/0205238 A1* | 7/2016 | Abramson | G01C 21/3484 455/456.4 |
| 2017/0094473 A1* | 3/2017 | Aksamit | H04W 4/027 |

* cited by examiner

*Primary Examiner* — Long K Tran
(74) *Attorney, Agent, or Firm* — Lewis Roca Rothgerber Christie LLP

(57) ABSTRACT

This disclosure relates to determining a context of a mobile device. A processor receives from one or more first sensors first sensor data in relation to the context. The processor then selects from multiple second sensors one or more selected sensors based on the first sensor data and based on an energy cost value associated with each of the multiple second sensors, the energy cost value being indicative of energy consumed when requesting data from each of the multiple second sensors. Next, the processor receives from the one or more selected sensors second sensor data and determines the context of the mobile device based on the first sensor data and the second sensor data. This reduces the overall energy consumption and therefore extends the battery life of the mobile device while still providing an accurate context determination.

26 Claims, 10 Drawing Sheets

ENERGY EFFICIENT MOBILE CONTEXT COLLECTION

CROSS-REFERENCE TO RELATED APPLICATIONS

The present application is related to WO 2013/059864 entitled "Mobile Content Delivery System with Recommendation-Based Prefetching" filed on 24 Oct. 2012, which is incorporated herein by reference.

The present application is related to U.S. 62/090,774 entitled "Notifications on mobile devices" filed on 11 Dec. 2014, which is incorporated herein by reference.

TECHNICAL FIELD

This disclosure relates to determining a context of a mobile device. In particular, this disclosure relates but is not limited to a computer implemented method, software and system for determining a context of a mobile device.

BACKGROUND ART

Mobile devices become increasingly sophisticated in the way they interact with the users of the mobile devices. Particularly, mobile device attempt to predict user behaviour or tailor the device's behaviour to situations that arise regularly in the particular user's usage pattern.

A wide range of sensors are available to the mobile device to determine the current context in which the mobile device is. For example, the mobile device can activate the GPS sensor to determine that the location of the mobile device is at the user's workplace. The mobile device can further determine how likely different user inter actions are at the user's workplace and adapt the user interface accordingly or operate the mobile device more efficiently, such as by pre-loading video data onto the internal device storage.

However, the sensors of the mobile device consume power when they are activated and therefore, activating these sensors to determine the context creates a disadvantage of a reduced battery runtime which, in turn, reduces the user's satisfaction with the device.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

A method for determining a context of a mobile device comprises:

receiving from one or more first sensors first sensor data in relation to the context;

selecting from multiple second sensors one or more selected sensors based on the first sensor data and based on an energy cost value associated with each of the multiple second sensors, the energy cost value being indicative of energy consumed when requesting data from each of the multiple second sensors;

receiving from the one or more selected sensors second sensor data; and determining the context of the mobile device based on the first sensor data and the second sensor data.

Since the second sensors are selected based on the first sensor data, those second sensors can be selected that have the maximum added benefit to the first sensor data. For example, if a GPS coordinate is received as the first sensor data, the additional benefit of a Wifi-based network location is minimal and the energy for waking up the Wifi module can be saved. This is an advantage over other methods that do not select sensors or do not make this selection based on the first sensor data. The method above reduces the overall energy consumption and therefore extends the battery life of the mobile device while still providing an accurate context determination.

It is an advantage that the actual measurement does not need to be processed but instead, the second sensor can be selected based on only the identification, such as "GPS sensor".

The method may further comprise determining an information gain associated with each of the second set of sensors based on the first sensor data, wherein selecting from multiple second sensors one or more selected sensors comprises selecting from multiple second sensors one or more selected sensors based on the information gain.

Determining the information gain may comprises:

evaluating a model using the first sensor data as input data, the model comprising parameters related to the multiple first sensors and the multiple second sensors; and determining the information gain based on an output of the model.

Selecting from multiple second sensors one or more selected sensors may comprise selecting from multiple second sensors one or more selected sensors based on an information threshold.

It is an advantage of the method that sensors are selected that provide just enough information without wasting too much energy for gathering data of an exaggerated accuracy.

The method may further comprise determining a weighted sum based on the first sensor data, wherein selecting from multiple second sensors one or more selected sensors comprises selecting one or more second sensors that are associated with a minimal energy cost while at the same time being associated with an information gain greater than the distance of the weighted sum from the information threshold.

The information threshold may be based on a number of base learners that have reached a decision in an ensemble model and how many base learners still need to reach a decision before the ensemble model can reach a majority vote such that the one or more selected sensors are the sensors which allow the ensemble to reach the decision at an expected lowest energy cost.

The base learners may comprise a random forest or boosted trees.

Receiving the second sensor data may comprise:

determining a point in time to retrieve the second sensor data at an optimised energy cost; and receiving the second sensor data at the point in time.

Receiving from the one or more selected sensors second sensor data may comprise receiving from more than one sensors second sensor data in parallel.

Determining the context may comprise evaluating a context model using the second sensor data from each of the more than one second sensors sequentially as input data to the context model.

Selecting from multiple second sensors one or more selected sensors may comprise selecting from multiple second sensors one or more selected sensors based on a sensor access model. The sensor access model may be a decision tree. The sensor access model may be a cascaded learning method.

The one or more first sensors may be activated independently from selecting the one or more selected sensors and determining the context of the mobile device.

It is an advantage that the method uses sensor data of sensors that are activated independently as such sensor data is accessible with a zero energy cost.

The method may further comprise excluding one or more excluded sensors from the one or more second sensors based on the first sensor data.

Excluding the one or more excluded sensors may comprise determining the excluded sensors based on one or more of:
 domain knowledge,
 database inference, and
 context data associated with the mobile device.

The one or more first sensors may be associated with a communications network to which the mobile device is communicatively coupled.

The first sensor data may include one or more of:
 time,
 cellular network data, and
 network service usage data.

Selecting the one or more selected sensors may comprise sending sensor selection data indicative of the one or more selected sensors to a mobile device. Receiving the second sensor data may comprise receiving the second sensor data from the mobile device over a data network. Determining the context may comprise sending context data indicative of the context to the mobile device.

It is an advantage that by performing the receiving and selecting steps remotely from the mobile device less energy is used by the mobile device which leads to longer battery runtime.

The method may be performed by a first process on the mobile device and the one or more first sensors are activated by a second process on the mobile device, the second process being different to the first process.

The one or more first sensors may be associated with an energy cost of zero.

The method may further comprise waiting for the first sensor data.

Selecting from multiple second sensors one or more selected sensors may comprise selecting from multiple second sensors one or more selected sensors based on an age of the first sensor data.

The first sensor data may be indicative of one or more of:
 a charging event of a battery of the mobile device; and
 a current cyclical time.

The first sensor data is indicative of a connectivity status change in relation to one or more of:
 a Bluetooth device;
 a Wifi hotspot; and
 a cellular network cell.

The method may further comprise one or more of:
 downloading content item based on the context; and
 displaying a notification based on the context.

The method may further comprise training a context model based on the first sensor data and the second sensor data, wherein determining the context may comprise evaluating the context model.

A non-transitory computer readable medium has an executable program stored thereon that when executed causes a computer to perform the above method.

A computer system for determining a context of a mobile device comprises:
 an input data port;
 a processor to
  receive through the input data port from one or more first sensors first sensor data in relation to the context;
  select from multiple second sensors one or more selected sensors based on the first sensor data and based on an energy cost value associated with each of the multiple second sensors, the energy cost value being indicative of energy consumed when requesting data from each of the multiple second sensors;
  receive through the input data port from the one or more selected sensors second sensor data; and
  determine the context of the mobile device based on the first sensor data and the second sensor data.

Optional features described of any aspect of method, computer readable medium or computer system, where appropriate, similarly apply to the other aspects also described here.

BRIEF DESCRIPTION OF DRAWINGS

An example will be described with reference to

BEST MODE FOR CARRYING OUT THE INVENTION

Figure 1:
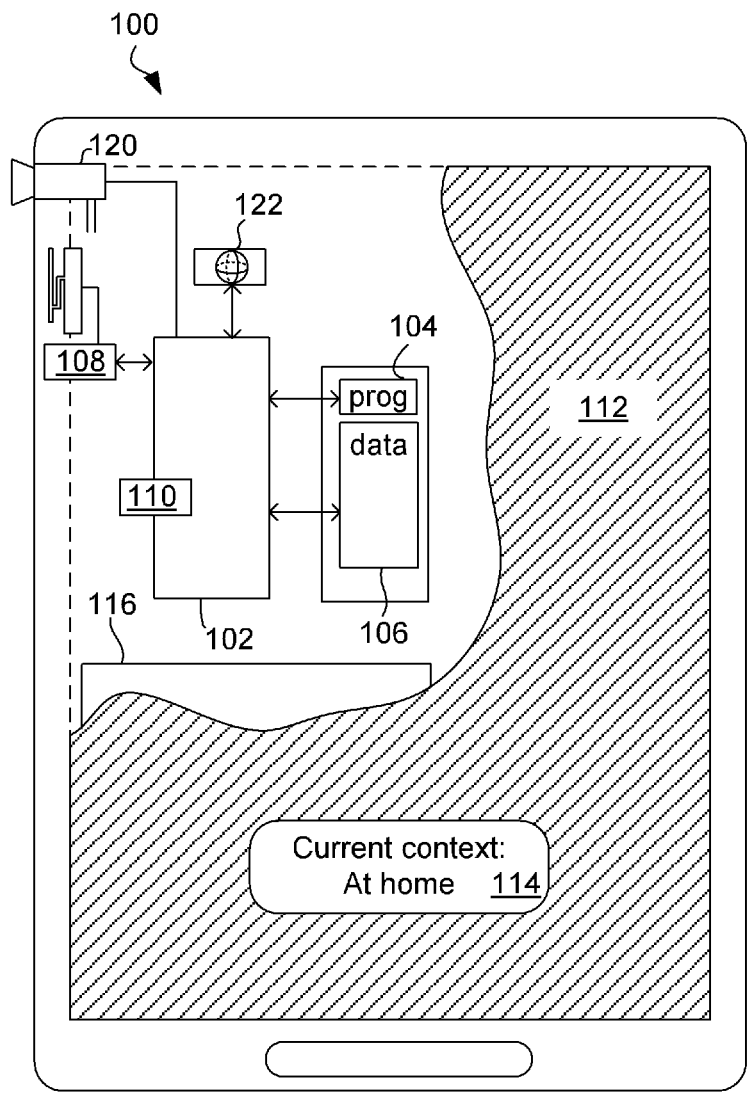
FIG. 1 illustrates a computer system for determining the context of the mobile device.

FIG. 1 illustrates a mobile device 100, such as a smartphone or tablet, for determining the context of the mobile device. The following disclosure equally applies to other computer systems for determining the context of a mobile device and therefore, mobile device 100 may simply be referred to as computer system 100. Computer system 100 comprises a processor 102 connected to a program memory 104, a data memory 106, a communication port 108 and a user port 110. Further, computer system comprises a display device 112 to display a message 114 to a user, a battery 116, a camera 120 and multiple sensors 122. The program memory 104 is a non-transitory computer readable medium, such as a hard drive, a solid state disk or CD-ROM. Software, that is, an executable program stored on program memory 104 causes the processor 102 to perform the method in FIG. 5, that is, receives sensor data from sensors 122, selects sensors and determines the context. The term "determining a context" refers to calculating a value that is indicative of the context. This also applies to related terms.

The processor 102 may then store the context on data store 106, such as on RAM or a processor register. Processor 102 may also send the determined context via communication port 108 to a server, such as content server.

Processor 102 may receive data, such as sensor data, from data memory 106 as well as from the communications port 108 and the user port 110, which is connected to a display 112 that shows a visual representation 114 of the context, such as text, to a user 116. In one example, the processor 102 receives sensor data from a network via communications port 108, such as by using a Wi-Fi network according to IEEE 802.11. The Wi-Fi network may be a decentralised ad-hoc network, such that no dedicated management infrastructure, such as a router, is required or a centralised network with a router or access point managing the network.

Battery 116 provides electrical energy to the components of system 100 including the sensor array 122 and processor 102. The battery 116 has a limited capacity and therefore, it is important to consider power consumption when adding functionality to the system 100.

Although communications port 108 and user port 110 are shown as distinct entities, it is to be understood that any kind of data port may be used to receive data, such as a network connection, a memory interface, a pin of the chip package of processor 102, or logical ports, such as IP sockets or parameters of functions stored on program memory 104 and executed by processor 102. These parameters may be stored on data memory 106 and may be handled by-value or by-reference, that is, as a pointer, in the source code.

The processor 102 may receive data through all these interfaces, which includes memory access of volatile memory, such as cache or RAM, or non-volatile memory, such as an optical disk drive, hard disk drive, storage server or cloud storage. The computer system 100 may further be implemented within a cloud computing environment, such as a managed group of interconnected servers hosting a dynamic number of virtual machines.

It is to be understood that any receiving step may be preceded by the processor 102 determining or computing the data that is later received. For example, the processor 102 determines sensor data and stores the sensor data in data memory 106, such as RAM or a processor register. The processor 102 then requests the data from the data memory 106, such as by providing a read signal together with a memory address. The data memory 106 provides the data as a voltage signal on a physical bit line and the processor 102 receives the sensor data via a memory interface.

The computer system 100 also comprises a sensor array 122 with a variety of sensors for identifying the current context. The sensor array 122 may include a time module, a GPS module, an accelerometer, a compass or gyroscope, a light or brightness sensor, a noise sensor, a detector of a charging power supply, a battery monitor, a headphone detector combined with a headphone jack, a thermometer, cellular or WLAN signal strength sensor, a sensor to detect nearby Bluetooth devices or any other context sensor. The sensor array 122 may also comprise connections to local sensors located on or near the user, such as heart-rate monitors embedded in chest straps or clothing, or EEG monitors. Sensor array 122 may further comprise software sensors, such as battery level and changing status, a list of installed as well as active applications and used and free memory.

Further, the system 100 may use data from remote sensors, such as the availability of spare network capacity in cellular networks or cellular or status information for nearby devices, provided wirelessly. Other sources for remote sensors may be users and their devices nearby, or have been in the same vicinity some time ago and allowing others, such as friends, or those willing to exchange data, to obtain all, or parts of their sensor streams.

Yet, other remote sensor streams may come from services available at a location, such as crowd information, or other service updates, such as weather conditions, traffic conditions, or train delays or any other information which may affect a user's decision on what to do next. Examples of user actions are information about how the user interacts with its environment. Examples include which application or service a user interacts and how. For instance, user actions on mobile devices include the URLs of web services accessed, and further session information, such as user session length, user content consumption behaviour, such as viewing a piece of content partially or fully once or multiple times, rewinding, fast forwarding, pausing or stopping a video or music clip, and any other interaction with the device or the user interface. For low frequency context data, such as battery level indicator or location information, the data itself is used. For higher frequency data, such as accelerometer or sound, processor 102 may extract time or frequency domain metrics from the raw data for use in context analysis. An example of such a metric is the frequency spectrum of the data. These features are then stored in data memory 106.

It is to be understood that throughout this disclosure unless stated otherwise, nodes, edges, graphs, solutions, variables, models and the like refer to data structures, which are physically stored on data memory 106 or processed by processor 102. Further, for the sake of brevity when reference is made to particular variable names, such as "information gain" or "information threshold" this is to be understood to refer to values of variables stored as physical data in computer system 100.

In some examples, the determined context may be used to decide whether to pre-fetch particular media content. In other examples, the context may be used to decide whether to display notifications to the user.

This disclosure describes an energy efficient learning based method for deciding when to show information to a user on a mobile device based on the information, sensor data and other inputs. Processor 102 uses the sensor data collected from software and hardware sensors as an input to a learning algorithm to make predictions on the reaction of the user to the notification in the context of the current situation and the content of the notification. These predictions are then combined with a utility model to decide whether to show information to the user in order to increase the user's engagement with an application or service without annoying or disrupting the user with badly timed or irrelevant notifications as disclosed in U.S. 62/090,774. The method proposed here achieves energy efficiency by collecting sensor data in a way that minimizes the power consumption required to reach a decision or if an energy budget is set, maximizes the accuracy of the decision within the budget.

Notifications are a way of displaying information that the user did not directly request from any application or service and are commonly used on mobile devices. Showing visual notifications on the taskbar, lock screen, or on top of open applications of a mobile device enables the user to quickly discover new information from applications without having to open them to check if there is anything new available. In addition to the visual component, these notifications may have audio or vibration components to help the user notice them.

From an application's point of view, these notifications allow an application to get the user's attention, if shown at a suitable moment. For example, a notification for a news headline from a news app can attract the user to open the news app when the user is waiting in a line at a bank. On the other hand, badly timed notifications may annoy the user and result in the user not using the app or even uninstalling it.

The timing of a notification can thus increase the user's engagement with an application or reduce it. Showing notifications when the user will have a positive reaction to them will maximize the engagement and increase the revenue the user will generate through more frequent usage of the application and better retention.

It is important for good timing to select the right situation to show a notification with given content, such as news or sports. These situations can be represented using data collected from the sensors. A mobile device can monitor the data collected from its hardware and software sensors and learn in which combinations of this data a user is likely to respond in a positive way to a notification by combining the sensor data with data on user reactions to notifications and other behaviour on the device in those sensor data combinations.

Figure 2:
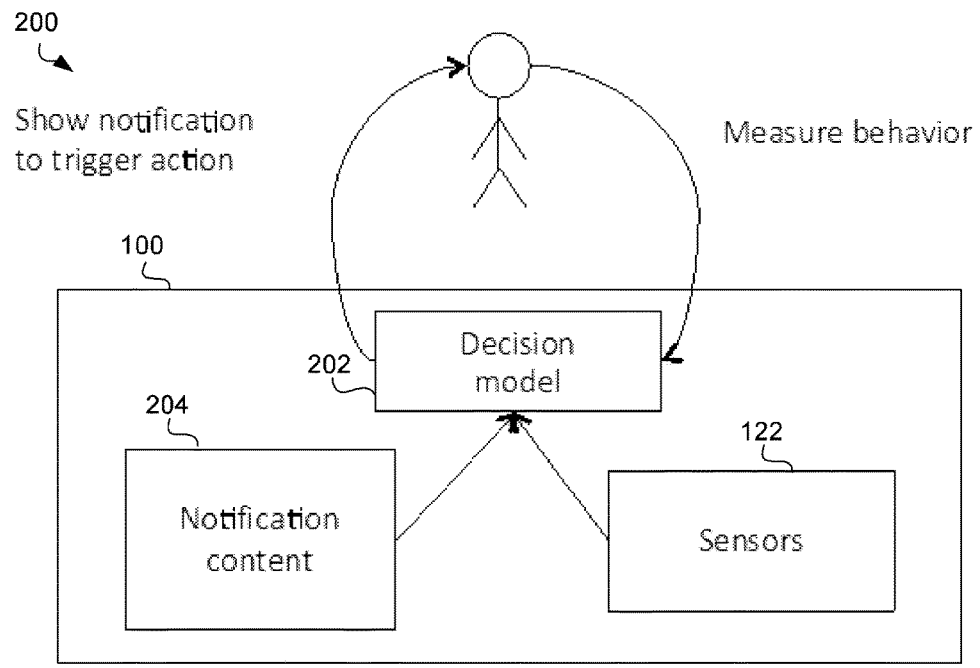
FIG. 2 illustrates the user interaction with the mobile device in FIG. 1.

FIG. 2 illustrates the user interaction with the mobile device 100. In this example, mobile device 100 comprises a decision model 202 evaluated and trained by processor 102 and stored on data store 106, notification content 204 stored on data store 106 or on a server and sensors 122. Based on the learning, the decision model 202 can then choose the best time to show a notification given its contents and the sensor data. These device sensors 122 may include time, location, accelerometer, microphone, light meter, camera, battery status, WiFi access point name and address, surrounding Bluetooth devices, cellular network parameters, screen lock status, and local and remote software state.

Some of the sensors 122 have a near zero cost for an application to monitor in terms of battery usage, such as time, while others such as accelerometer and scans for surrounding Bluetooth devices are relatively expensive. The energy required to collect the different data can vary by several magnitudes. The monitoring can be done periodically by polling the sensors at fixed or variable intervals or it can be event driven, so that the sensor data collection is triggered by a change in the environment. For example, a change in the network connectivity or location could trigger the collection of other sensors.

Processor 102 may transform the sensor data to features usable by a machine-learning algorithm. This transformation or mapping can include steps such as centering, scaling and reducing skewness of the data. It can also include mapping the sensor data to different domains, using methods such as the Fourier transform. Further, data from multiple sensors can be combined into higher-level features by applying logical or learned rules.

When predicting human reactions to notifications, processor 102 can derive high level features corresponding to human situations from the sensor data using logical rules or relationships in the observed data. For example, for predicting human behavior higher-level features, such as "at home", "at work", "in bus", "with family", can produce better results than using low-level raw data.

Processor 102 may perform a machine learning algorithm to learn to predict outcomes (i.e. user reaction to notification) from features by evaluating a model trained with past feature-outcome combinations.

Figure 3:
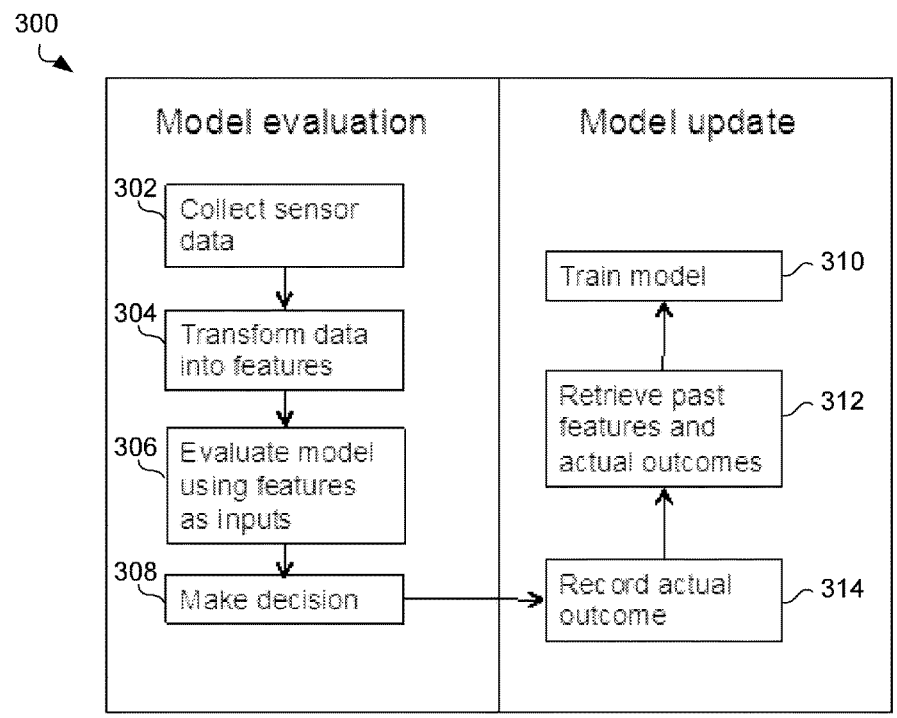
FIG. 3 illustrates a machine learning method for predicting user behaviour to notifications.

FIG. 3 illustrates a machine learning method 300 for predicting user behaviour to notifications, that is, a framework for using a machine learning algorithm to predict user reactions to notifications.

For a machine learning algorithm to be able to predict the reaction, it first receives 302, depending on the type of the algorithm, either some or all of the features describing the current situation that were used to train it. For the prediction to be unambiguous the algorithm reaches a majority vote with a large enough confidence in the outcome through a decision margin, or a high enough confidence value, or other means of distinguishing between ambiguous and unambiguous prediction outcomes.

Processor 102 transforms 304 the sensor data into features and trains a learning algorithm using collected features and the observed outcomes, i.e. how the user reacted when a notification was shown. After the learning system on the device is trained, it will start monitoring asynchronous events, such as the user becoming present on the device. Such an event would trigger the learning system to collect the other sensor data to derive the features needed to evaluate 306 the trained model and make a prediction.

Processor 102 uses the outcome of the evaluation of the trained model to make the decision 308 whether to show the notification or not. This prediction outcome can be a probability of whether the user will open the notification or discard or ignore it. Processor 102 may use this probability directly to make the decision or it can be combined with other data, such as a cost-benefit model of different reactions.

On the model updated side of method 300, processor 102 records 314 the actual outcome of displaying the notification to the user, that is, whether the user reacted to the notification. Processor 102 further retrieves 312 past features and actual from data memory 106 and trains 310 the model based in this data.

It may be possible to perform training time cost-accuracy optimization with the assumption that the cost of acquiring data for features is known at training time, that is well ahead of the time when the data is needed. However, in a mobile system with multiple users of sensor data, this is often not the case: Potentially expensive sensor data requested by other applications and services can be used to trigger the learning, in which case the sensor data has no cost. Processor 102 can use recent values of data requested for other applications in place of current data and the availability of such cached data is unpredictable. Further, energy cost in terms of battery use can depend on the battery state. If the device is charging or battery is nearly full, the relative impact of acquiring sensor data for features is less significant than when the battery is not charging and is nearly empty.

This disclosure describes a mechanism with model evaluation time minimization of energy use to take advantage of the varying energy cost of acquiring sensor data. It can be combined with training time measures to reduce the cost, but does not depend on them.

Processor 102 makes a decision on whether to show a notification based on the result of one or more prediction models, which use features derived from sensors as inputs.

Figure 4:
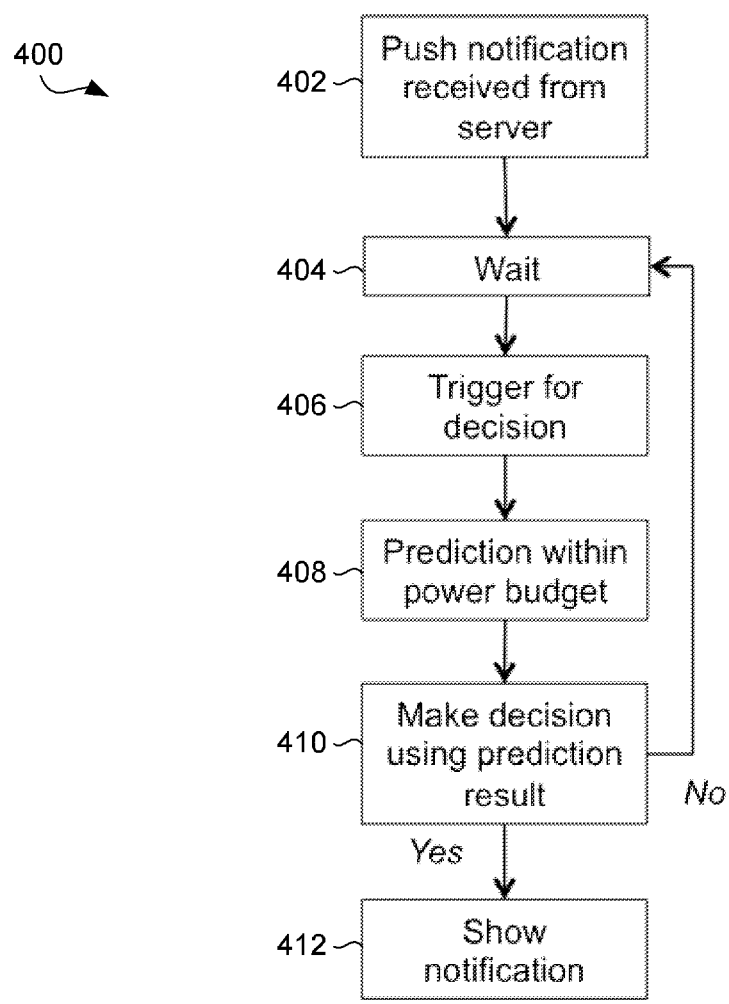
FIG. 4 illustrates a method for showing notifications on mobile communication device.

FIG. 4 illustrates a method 400 for showing notifications on mobile communication device 100. Processor 102 starts method 500 when an application on a mobile device receives 402 a push notification message from a server. The server sends a push notification to an application on the mobile device when there is significant new information available, such as a new email message. This message contains a description of the data that should be shown to the user and potentially a URI for downloading more data, such as images or a video file.

The application will wait 404 and listen to sensor data events, which are provided asynchronously by the underlying operating system. For example, events such as the user unlocking the screen of the mobile device or an update from the location sensors could be used. Once an event occurs this event triggers 406 a decision and processor 408 determines predictions 408 within a power budget. Processor 102 collects data from the sensors iteratively until a decision to show the notification can be made 410 with enough certainty or the energy budget for the decision is used.

The energy use can be minimized by making the decision 410 based on a set of sensors that minimizes the energy use for sensor collection while ensuring that the system has a high enough confidence in the decision. Alternatively, the accuracy of the decision can be maximized by including as many sensors as possible while staying within the limits of the energy budget.

The decision to show the notification is made based on the outcome of the prediction 408 combined with a utility model. The prediction outcome is interpreted as a probability of the user opening a notification. This allows making the decision based on the expected utility of the decision.

Figure 5:
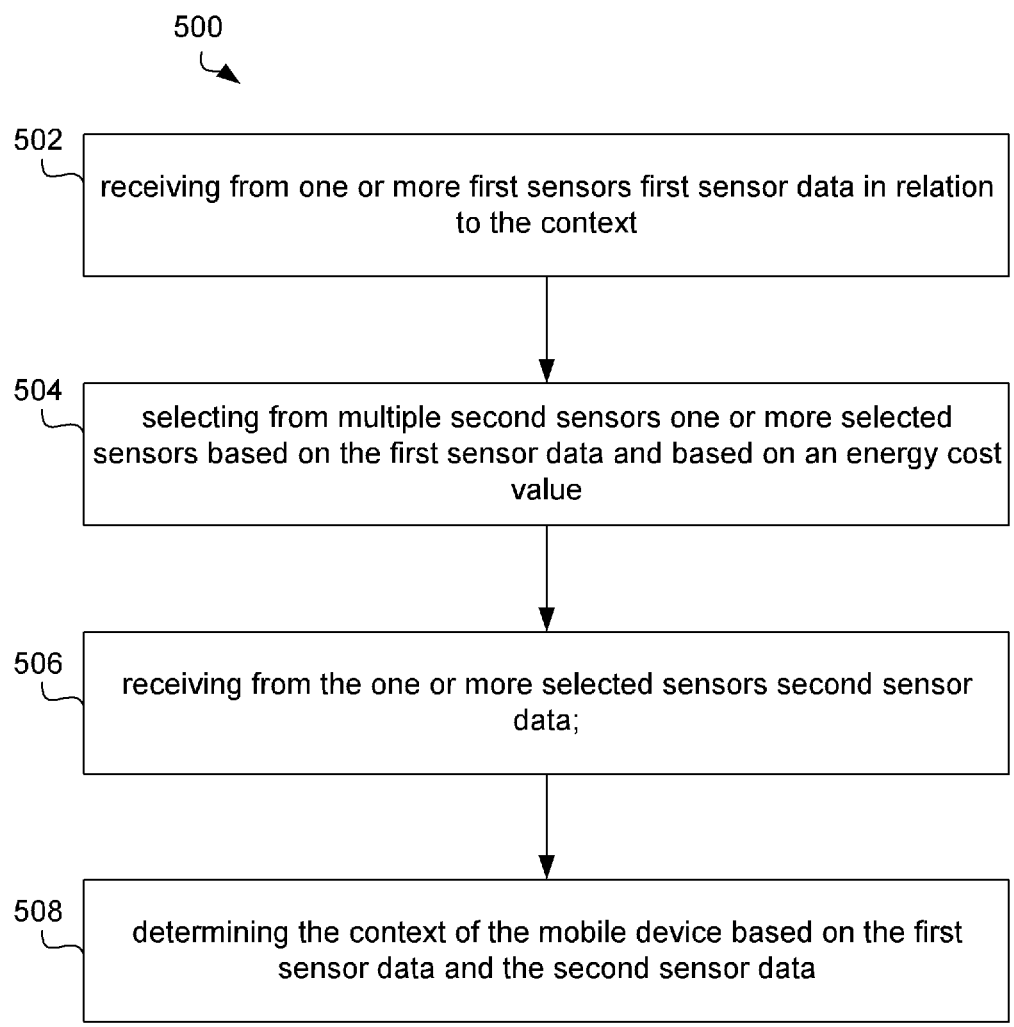
FIG. 5 illustrates a method as performed by processor for determining the context of a mobile device.
Figure 6:
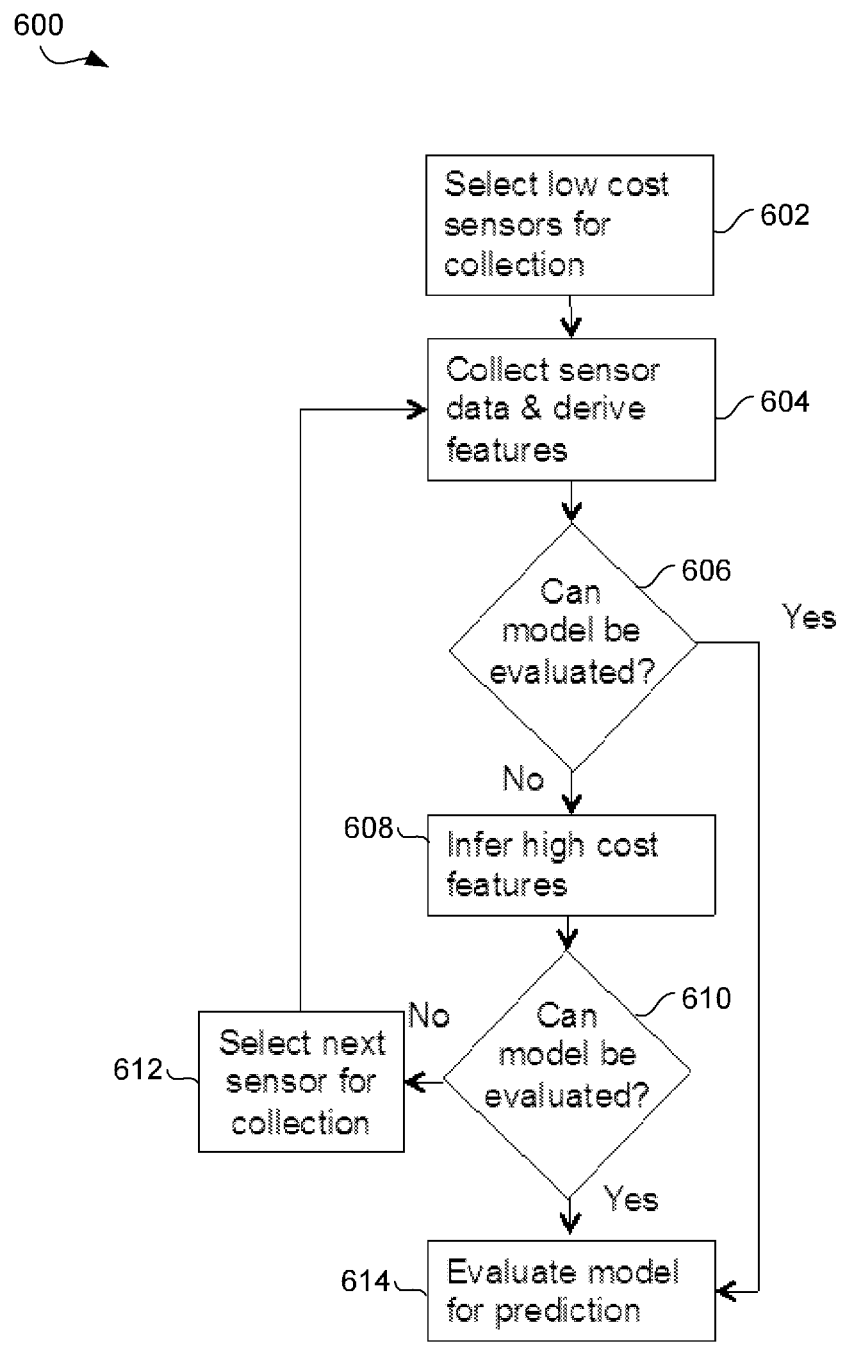
FIG. 6 illustrates an expanded view of the steps of FIGS. 4 and 5.

FIG. 5 illustrates a method 500 as performed by processor 102 for determining the context of a mobile device. FIG. 6 illustrates an expanded view of the prediction and decision steps of FIGS. 4 and 5. It is noted that method 500 may be performed by the mobile device itself, or by a processor that receives the sensor data from the mobile device or communication network.

FIGS. 4, 5, and 6 are to be understood as a blueprint for the evacuation planning software program and may be implemented step-by-step, such that each step in these figures is represented by a function in a programming language, such as C++ or Java. The resulting source code is then compiled and stored as computer executable instructions on program memory 104.

It is noted that for most humans performing the methods in FIGS. 4, 5, and 6 manually, that is, without the help of a computer, would be practically impossible. Therefore, the use of a computer is part of the substance of the invention and allows performing the necessary calculations that would otherwise not be possible due to the large amount of data and the large number of calculations that are involved.

Referring back to FIG. 5, processor 102 receives 502 from one or more first sensors first sensor data in relation to the context. In one example the one or more first sensors are activated independently from selecting the one or more selected sensors and determining the context of the mobile device. The first sensors may be activated by a first process on the mobile device and the one or more first sensors are activated by a second process on the mobile device, the second process being different to the first process. This means that the process that selects the sensors has no control over the activation of the first sensors and as a result, the first sensor data is available to the selecting process with no additional energy cost. In other words, the first sensor data can be considered to be free, that is, has an energy cost of zero, from the point of view of the selecting application.

In one example, the first sensor data comprises an identification of the one or more first sensors. That is, in some cases, the information about which type of sensor was activated may be is sufficient for processor 102 to select further sensors to determine the context of the mobile device. For example, when a photography application activates the camera 120, processor 102 may not process the actual video data to determine the context but it may be sufficient to receive an indication that the camera has been activated. A photography context may be a likely candidate as the context of the mobile device and in that context, the notification to emails and text messages may be suppressed as the user is unlikely to act on notifications while taking a video.

Each of the sensors 122 has an associated energy cost, which is the cost to obtain sensor data from that sensor. For example, the GPS sensor may be integrated into an integrated circuit module and is powered off when it is not in use so that it does not consume any energy from the battery 116. Waking up the GPS sensor and obtaining a GPS position consumes energy and constantly tracking of the GPS position drains the battery 166 quickly and results in the device 112 being inoperable due to depleted electrical energy. In one example, the energy cost for each sensor is stored in a database, data table or other data structure on data memory 106.

In one example, processor 102 selects in step 502 first sensors that have a low collection cost to be collected initially as shown in step 602 of FIG. 6. The energy cost of sensor data collection varies significantly, with the energy costs varying by factors of 10-1000 between different sensors. The initial set can be chosen for example by choosing the sensors with energy cost less than 5% of the maximum.

The first set can also be chosen based fully or partially on the training of the algorithm, if the training defines an order of evaluation for the features derived from the sensor data. For example, cost aware learning algorithms, such as cascaded models and "Greedy Miser" can be used as sensor access models and define the order of evaluation (and extraction of features) during the training phase of the algorithm based on a combination of feature information value and cost. Cascaded algorithms define the order by feature group and Greedy Miser one feature at a time.

Then, processor 102 collects 604 data from selected sensors, which again relates to step 502 in FIG. 5. Processor 102 then uses this data to derive all the features that can be derived directly from it. After this step, there may still be a number of features that are required for evaluating the trained model to make a prediction, but for which some or all the underlying sensor data is missing.

The energy use of the sensors collected is recorded for use in step 612 to ensure that the total energy used will stay within the energy budget.

Next, the processor 102 attempts to evaluate 606 the model with the feature data that is available. This partial evaluation of the model will produce an outcome that can be interpreted as a probability. A threshold value for the probability can be calculated as discussed in step 614. This threshold value is used to decide, if the model can provide a clear result. In this case the process moves to step 614. Otherwise, the processor 102 moves to step 608 and stores any intermediate results calculated during the evaluation of the model for future use.

The exact method of deciding whether the model can provide a clear result depends on the machine learning algorithm used, as discussed below.

Many machine learning algorithms, such as linear regression, logistic regression and neural networks have a very low computational cost for evaluation of a trained model. This makes it feasible to evaluate the model using the available features and exhaustively evaluate the possible values for missing high cost data. For example, with a single missing feature, such as "in bus" binary feature, both the case "in bus"=true and "in bus"=false could be evaluated. If the outcome of the model is not dependent on the value of the feature, given the values of the other features, then the model can be considered to have an unambiguous evaluation outcome without the missing feature(s). For example, if in the case of the "in bus" example, the model would produce an outcome above the threshold with both values of the feature, given the features available. If this is not the case, the partial results, such as the weight-feature multiplication results for each feature are cached for use in the next round of model evaluation after collecting one or more missing features.

Often, processor 102 can evaluate sensor access models, such as decision trees to find a solution without evaluating all the features. The order of evaluation of the features in tree-based algorithms can be influenced when training the model by using the energy costs of the features as a part of the node splitting criteria. This leads to high cost features to be more likely to be evaluated after low cost features. Then, the high cost features may not be required if an early solution is found.

Ensemble methods of sensor access models, such as random forests and boosted trees use collections of trees as base learners. The outcome of the ensemble method is then a regular or weighted average of the base learner outcomes. The ensemble methods can be stopped early, if the votes from the base learners reach the required decision threshold. When the trees used as base learners are constructed with energy cost of the features as a part of the node splitting criteria, then many of the base learners will be able to finish without the high cost features. If the ensemble method cannot provide an unambiguous outcome, the finished base learners results will be stored.

Cost awareness can also be introduced at a higher level in training to take into account the overall cost and accuracy of all the trained trees. An example of this is Greedy Miser, a boosted tree algorithm, which trains the trees one after another and avoids high cost features that have not been previously used, unless they improve the total accuracy of the model enough to offset the cost.

Cascaded models provide another training time approach to reduce the cost of making predictions. In a cascaded model, there are two or more stages, and the algorithm first evaluates the first stage. If the classification result of the first stage is below the threshold, the algorithm stops with a negative prediction outcome. Otherwise, if the result is above the threshold, it proceeds to next stage. This continues, until it reaches the final stage and then the result of the final stage is used as the outcome. For cascaded models, the system would test the current stage of the cascade using the known features using the exhaustive evaluation approach discussed above. Each stage would be treated separately, but extracted feature values would be carried over to next stages. A benefit of using cascaded models is that separate feature groups for each stage reduce the complexity of the exhaustive evaluation.

In the next step, processor 102 infers 608 as many as possible of the required, but missing features depending on currently uncollected high cost sensor data. The inference can use logical domain specific rules or relationships derived from the collected data. These methods can then infer the missing features from collected sensor data and features derived from the collected sensor data. An example of a logical rule is "if 'at home' equals true, then set 'in bus' to false". Inferring from combinations of observed data in the past looks for combinations of features and sensor data, which have never occurred or have occurred extremely rarely. This requires more observations to avoid ruling out less frequent but possible combinations of features.

Further, a missing feature can be inferred from a combination of current values of other features and sensor data and past, cached values of the feature. This again can be done using logical domains specific rules or by observing the relationships between the sensor data with the features. As an example of logical rule based inference, if last motion detection sensor data showed that we were "in a car" and the device was charging, and the device is still charging, the cached value of motion data "in car" can be considered to still be valid. This relationship could be also learned from the data by finding the frequency of events when the value remained "in car" while charging status was true versus the frequency of events when it changed to a different value. The age of the cached observation can be used as an additional criterion, for example if the last value of at home feature was true and the observation was 5 minutes old and the time of day is 10 PM, based on relationships in the data it is highly likely to still be true. On the other hand, if the observation is one hour old and it is 7 AM on a weekday morning, the value is less likely to be correct.

Inferring values of missing features can increase the error of prediction, if relationships in the data are used to dynamically infer missing feature values. The less data points there are and the more noise there is in the data, the higher the risk of erroneous inference becomes. The probability of erroneous inference and its effects on the result of the prediction can be calculated based on the distribution of the observed values for the features used for inference and the target feature as discussed in Example 5. The inference will be only used, if the expected error is low enough to allow making a decision without additional sensor data collection. The acceptable error level can depend on a policy-defined threshold or be calculated dynamically based on costs and benefits of false positives and false negatives.

When the system is operating under an energy budget, even very speculative inference can improve the performance. There will be cases, in which the energy budget has been used and does not allow collecting more sensor data and the currently derived features do not allow making a decision. Then, inferring missing values will often add more information than error and will allow the system to make a better decision.

After that, processor 102 tests 610 if model can be evaluated. If processor 102 is not able to evaluate the model, processor 102 repeats the test from step 604 and if successful, go to step 614 to evaluate the model and make decision using the prediction outcome on whether to show the notification.

If model could not be evaluated, processor 102 select 612 next sensor to acquire further data, which related to step 504 in FIG. 5. Processor 202 selects 504 from multiple second sensors one or more selected sensors based on the first sensor data and based on an energy cost value associated with each of the multiple second sensors. The energy cost value is indicative of energy consumed when requesting data from each of the multiple second sensors.

In one example, there is one set of sensors before any of the sensors is activated and that set comprises all possible sensors including sensors internal to the mobile device 100 and external sensors, such as network status. The activation of one or more of these sensors then defines these activated sensors as the 'first' sensors. The remaining sensors are the ones from which processor 202 can select the best sensors to achieve a sufficiently accurate context, that is the remaining sensors, also referred to as the second sensors, is the set of all sensors without the already activated sensors.

This step 612/504 uses exhaustive evaluation of possible feature values to select which sensor data to collect next. After making the selection the process moves back to step 604 and collects data from the chosen sensor. Then the process continues until the algorithm reaches step 614 where step 604 relates to step 606 and step 614 relates to step 508.

The set can be chosen based fully or partially on the training of the algorithm, if the training defines as an order of evaluation for the featured derived from the sensor data. For example, cost aware learning algorithms, such as "Greedy Miser" define the order of evaluation (and extraction of features) during the training phase of the algorithm based on a combination of feature information value and cost. Other algorithms, such as cascaded algorithms, only define the set of features to get next. The required sensors can be derived from the feature(s) needed next.

If the trained model does not define the next sensor to collect for deriving required features for learning algorithm, it is selected as follows:

A) Exhaustively evaluate all the cost of collecting the sensors in each possible order to finish the evaluation of the algorithm for every feature value combination. The costs are then multiplied with the probability of seeing each combination and summed together. These probabilities can be derived from the training data on the device or on a global basis from behavior of all users, or be considered as equal.

B) Select the sensor with the lowest expected cost and go back to step 604 of the evaluation process to collect the selected sensor.

A possible enhancement is to only evaluate the most common combinations of feature values based on frequency in the training data instead of all the combinations. This would still provide a good estimate of the expected cost, while reducing the search space.

The selection process can be applied directly to reduce the energy use of an algorithm, which requires a group of features at a time, such as cascaded models, to select which sensor to get next for the group of features needed for the current stage in the cascade. Then the other steps of the process can work on the stage of the model and the feature group associated with the stage.

The implementation details of calculation depend on the learning algorithm. Two possible realizations for different algorithms are detailed in the examples below.

When the operation is constrained within an energy budget then the estimated energy use is tracked and limited, so that the total energy use will not exceed the budget. This would also limit the search space for the exhaustive evaluation. The next sensor would then be selected based on the results of a more limited exhaustive search, before moving back to step 604 to collect the sensor. If no more sensors can be collected without causing the cumulative energy use to exceed the energy budget, the system would move to step 614.

In order to select the most energy-efficient sensor, processor 102 may further determine an information gain for of the second set of sensors and the information gain may be based on the first sensor data. For example, if the first sensor is a Wifi network adapter that senses the presence of a home Wifi, then the GPS sensor is likely to have limited information gain because processor 102 can approximate the position of the mobile device using only the Wifi data. Therefore, processor 102 selects the sensors based on the information gain to select only those sensors that add information on top of what is already available. This reduces unnecessary energy consumption, which leads to longer battery runtime.

Figure 7:
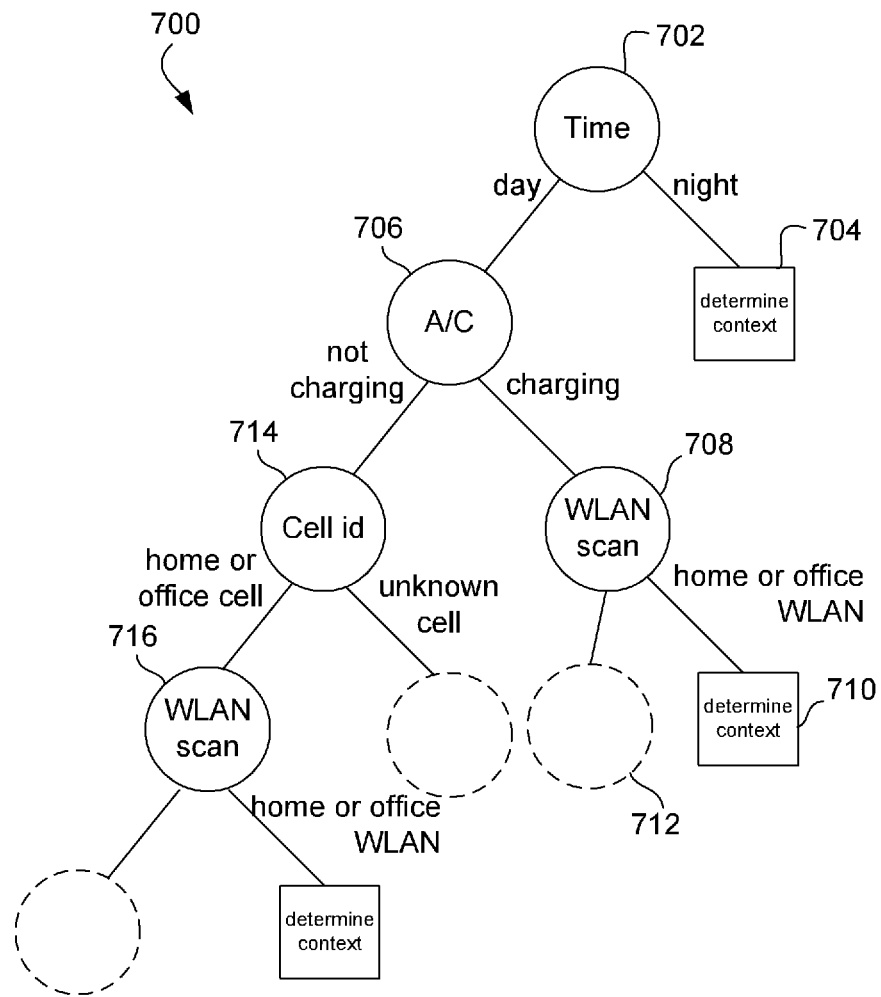
FIG. 7 illustrates a decision tree.

FIG. 7 illustrates a decision tree 700 as stored on data memory 106 and determined by processor 202 based on the energy cost for sensors for Time, A/C, Cell ID and WLAN scan. In this example, the first sensor is the timing module of the device 100, which provides the accurate time for a very low energy cost. The time module is represented by first decision node 702. The smallest possible energy cost may be associated with an arbitrary number, such as '1'. In this example, the user is always at home at night, such as between 9 pm and 6 am and processor 202 has trained a model such that the context variable "at_home" has the highest value if the time value is between 9 pm and 6 am. As a result, the decision during night time leads straight to context determination 704 without the need for further sensor selection.

During the day, however, the user is not always at home, so processor 202 selects a second sensor, which in this example, is the A/C sensor represented by node 706. The A/C sensor detects whether the mobile device 100 is charging or not. Processor 202 may have trained the context model that when the device is charging, the user is either at home or at the office. In both locations there are known Wifi hotspots which enables the processor 202 to determine the location based on the presence of these hotspots. As a result, processor 202 selects the WLAN sensor by initiating a WLAN scan represented by node 708. The corresponding sensor data comprises the names of all Wifi hotspots and processor 202 can check whether the office or home hotspots are contained in the sensor data. If they are, processor 202 can determine the context in node 710. Otherwise, more sensors need to be selected, which is indicated by a dashed circle 712.

Going back to node 706, if the mobile device 100 is not charging, processor 202 selects the GSM module as the next sensor and requests the cell identifier in node 714 as the user is most likely underway and scanning for hotspots would incur a relatively high energy cost, which should be avoided when the prospects of success are low. If the cell identifier is identical to the cells of the home or office location, processor 202 activates the WLAN scan 716 as described above.

After selecting the next sensor, processor 102 activates the selected sensors and receives 502/604 from the selected sensors second sensor data. Processor 102 then uses this data to derive all the features that can be derived directly from it. After this step, there may still be a number of features that are required for evaluating the trained model to make a prediction, but for which some or all the underlying sensor data is missing. The energy use of the sensors collected is recorded for use in step 612 to ensure that the total energy used will stay within the energy budget.

Processor 102 evaluates 508/614 the trained machine learning model, that is, the context model, using the features that are available to determine 208 the context of the mobile device based on the first sensor data and the second sensor data. It then converts the result of the prediction into a decision of whether to show a notification to a user or not.

If the outcome of the prediction is a probability or a value that can be interpreted as a probability, a threshold for the probability can be used. For example if the predicted probability of the user opening the notification would need to be over 60%, before showing the notification to reduce the irritation of the user from showing notifications at marginal times. The threshold value can be chosen to maximize the expected utility that is the difference between the benefit of having the user open the notification and the cost of interrupting the user.

The cost of a false positive i.e. a user being shown a notification that he does not open, can be quantified by measuring the negative effects of a user discarding or ignoring notifications in terms of a decrease in the expected user lifetime value from higher probability of user uninstalling the application or other metrics. The benefit of a true positive, i.e. the user opening the notification, can be quantified by measuring the positive effects of a user opening a notification in terms of an increase in lifetime revenue from more active engagement with the application or other metrics. An opportunity cost is incurred for a false negative, i.e. not showing a notification when the user would open it. This would typically equal the benefit from a true positive. A true negative, i.e. not showing the notification when the user would not open it, would have no benefit or cost.

The expected utility of showing the notification can be calculated by combining the cost of the false positive and the benefit of the true positive with the predicted probability of the user opening the notification. The system would then show the notification, if the expected utility were above zero.

For example, if the estimated probability of user opening the notification was 50%, the cost of a false positive was 0.7, and the benefit of true positive was 1, then the expected utility of showing the notification would be: 0.5*1−(1−0.5)*0.7=0.3. Hence, the decision in this case would be to show the notification.

A threshold value for the probability can be calculated given the cost and benefits of true and false positives. The threshold is calculated by evaluating at what probability the expected costs and benefits would match. In the example above, that probability threshold would be calculated to be 0.41 by solving X in equation: X*1=(1−X)*0.7.

This threshold can then be used in step 606 to decide when the model can be unambiguously evaluated. If the outcome of the model both with and without the missing feature(s) is above or below the threshold given the values for available features, then the model can be considered to have an unambiguous evaluation without the missing feature(s) and the process can finish without further sensor data.

A drawback to collecting only the minimum set of sensors to reach a decision is that most learning algorithms are trained with all the features present in every data sample. Thus, samples with only a subset of the features are difficult to be used for training the full model depending on all the features.

To ensure that the model can be trained, enough data samples are used with all or enough of the sensor data. If the predictive model is trained on the device, an initial training period is defined during which all the sensor data is collected when an event triggers the collection. If the predictive model is trained on the server over similar users data, this initial collection phase could be avoided. After the initial training period, additional sensor data can be collected to improve the accuracy of the model. For example, when a notification is shown, but the user does not open it, extra sensor data is collected to improve the predictive accuracy in this situation. Another example is to collect full set of data at randomly chosen instances.

In one example, processor 102 excludes sensors based on the received sensor data such that these excluded sensors are not candidates for selection. In order to determine which sensors to exclude, processor 102 may apply domain knowledge, database inference or context data associated with the mobile device. The description below provides an example where the model produces the same outcome, e.g. "show notification", regardless of the value of the "with family" feature. As a result, a decision on whether to show the notification to the user can be made without collecting the data, that is, processor 102 excludes the Bluetooth sensor and that sensor is not a candidate for selection anymore.

Example 1: Inferring Features Based on Logical Rules and Using a Linear Prediction Algorithm for Decision Low cost sensor data is collected when a significant event, such as connection to a new WiFi access point, or the user becoming present on the device, triggers the collection. The following sensors are collected: 1) WiFi SSID (name of access point) 2) time 3) user presence. The system employs a simple rule based approach for learning the most common SSIDs during typical at home and at work hours and then uses the learned SSID names to detect when the user is at home or at work. The system uses a filter mechanism for deriving additional features from time, such as "weekday"/"weekend" and "morning"/"evening". Using the collected data, the rule for SSIDs and the time filters, the system can then derive additional features from the SSID and time, firstly that the user is at home from the WiFi SSID and secondly that it is a weekday evening from the time.

The system can also infer values for some features depending on high cost sensors without collecting data from these sensors. For example, the users behavior may change when travelling by bus. Although "in bus" feature can be derived from the device moving at a certain speed according to the locations data and vibrating in a certain frequency range according to the accelerometer, it can be inferred from the value of the "at home" feature being true that "in bus" is false through logical reasoning. This allows avoiding battery-consuming collection of accelerometer and location sensor data.

Other important features depending on high cost sensors cannot be inferred from the low cost sensor data or features, but the effect from their different possible values can be tested. For example "with family" can be derived from the Bluetooth scan of surrounding devices containing the addresses of devices belonging to devices most often seen when at home. However, the feature only has two values "true" and "false". Before collecting the costly Bluetooth data, the system evaluates the learned model with both possibilities. With a linear model, where the partial results from each feature are independent from each other and added together, a partial result from other features values only needs to be calculated once. With a non-linear model, such as a neural network, where the final result depends on a non-linear combination of individual features values, lower level partial results from other features values would only need to be calculated once. If the model produces the same outcome, e.g. "show notification", regardless of the value of the "with family" feature, a decision on whether to show the notification to the user can be made without collecting the data.

Otherwise, if the outcomes for "with family"=true and "with family"=false differ, the system will cache the outcomes from the model with both values of the "with family" feature. It will then perform the Bluetooth scan, derive the value of "with family" feature, and choose a cached version of the result with that value.

Example 2: Inferring Features Based on Relationships in Data

In the case of the above example, using past data it would be possible to find that the combination of "in bus" and "at home" had never occurred after 100 data points of "at home", and therefore infer that the value of "in bus" is false with a high probability. This approach can be used for inferring values of high cost features, for which logical rules could not be created reliability, e.g. inferring "watching TV" when "at home" feature has the value false.

Example 3: Inferring Features Based on Cached Value of High Cost Sensors and Fresh Values of Low Cost Sensors Showing notifications, when the user is driving is to be avoided for most applications. However, detecting whether the user is in the car and driving or not requires tracking charger status and GPS, which has a high battery cost. If the current value of "in car" is unknown, but the past value was true and the value of the charging feature has not changed since, the system can use the cached value and reduce the frequency of collecting the expensive GPS sensor data.

Example 4: Example 1 Using "Random Forest" Machine Learning Algorithm

The random forest algorithm uses a set of decision trees which are each trained using a random sample of training data and the feature for each node in each tree is chosen based on some selection criteria out of a random subset of features. The outcome of the forest for a classification problem, such as deciding whether to display a notification is derived from the majority vote of the partial decisions from trees. In contrast to a linear algorithm, which combines all features together to make a prediction, decision trees are evaluated one feature at a time. The feature evaluation order depends on the information value of the feature (i.e. how much it improves the prediction) and it can also depend on the cost of the feature. The order is determined when the tree is constructed when training the algorithm.

In the above example, if the random forest algorithm is used, the decision trees are constructed so that low cost features depending on only time and SSID would be evaluated first in most trees (not all due to the random subset of features being used for choosing the feature for each node). Due to this, many trees would be able to reach a decision without higher cost features.

If not enough trees can reach a decision to allow a majority decision, more features are used. The results of the finished trees and partially finished trees are then cached, so they can be reused once the missing data has been acquired.

The system will then perform inference on the values of as many missing features as it can through logical rules and analysis of the data as described in Example 1 and 2. Additionally, it will use any stored cached values for features that are still valid based on the analysis of collected sensor data and other features as discusses in Example 3.

After these measures, the system will continue evaluating the trees and may be able to reach a majority decision. If not, it will next decide on which missing features it will get based on the energy cost and expected information value of the features. The energy cost and expected information value are balanced, by choosing to get the sensor data for the feature(s), which is (are) likely to allow the algorithm to finish with the lowest cost.

In this example, the system will first evaluate a 11 tree random forest using time of day, day of week, "at home" and device is charging features which have a nearly zero acquisition cost. When the random forest was trained, the near zero cost of these features caused most of the trees to have these variable close to the root of the tree. The evaluation with only these features allows 6 of the 11 trees to finish and 3 of the trees to evaluate partially. The system records the classification results of the evaluated trees (4 yes, 2 no) and the state of the remaining trees. It then checks, which features are required next by each tree that has not finished.

Two trees require next the feature "in bus", which can be inferred to be false from the state of the features "at home" and "charging". This allows one more tree to finish, with 2 partially evaluated trees and 1 tree that was not started. Now the votes are 5 yes, 2 no.

Three trees depend on the feature "in car", which can be inferred to be false from "at home" feature using a logical inference rule put in place by the system designer. One more tree can finish and reaches a decision "no", leading to votes: 5 yes, 3 no.

After this, no more feature values can be inferred or derived from cached values of sensors. There are 3 more trees to evaluate with one depending on the feature of "watching tv" and two on the feature "with family". The system next chooses which one it should acquire.

It does this by evaluating the expected cost of the algorithm to finish when getting first either Bluetooth data for deriving "With Family" feature or microphone data for "Watching TV" feature.

Figure 8A:
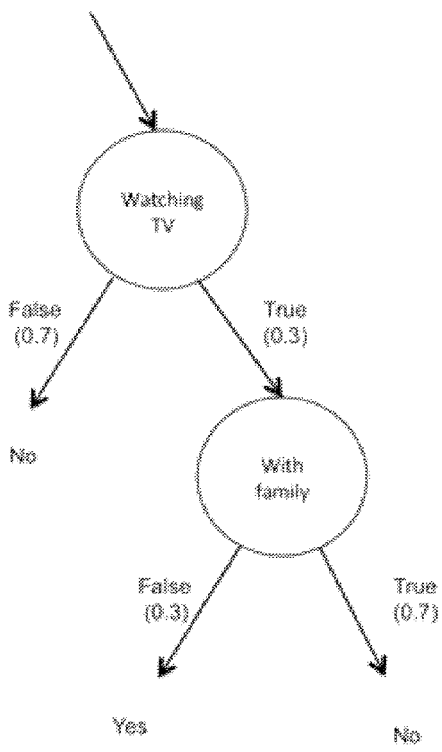
FIGS. 8a, 8b and 8c illustrate partially evaluated trees.
Figure 8B:
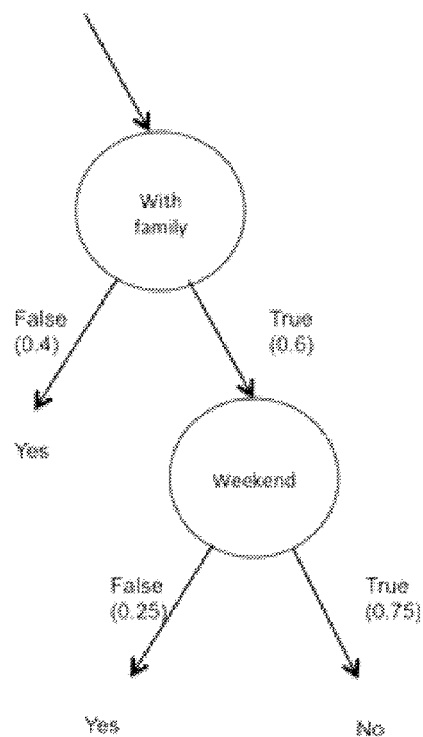
Figure 8C:
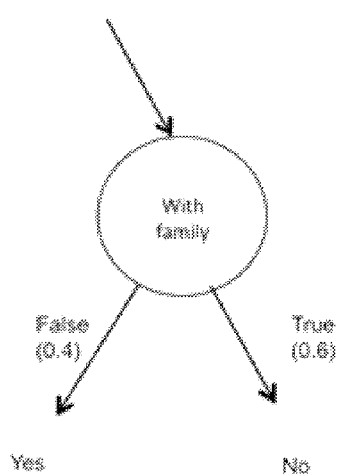

FIGS. 8*a*, 8*b* and 8*c* illustrate the three remaining trees. If the system gets the microphone data, this will have the cost of 100 and will have the following possibilities: "Watching TV"=false with the probability of 0.7 based on the data will finish first tree with result "no". Now, the votes are 5 yes, 4 no. Therefore, at least one more tree has to be evaluated. The other two trees depend on the "with family" feature and this requires getting the Bluetooth sensor data having the cost of 80. "With family" node in tree 2 has 40% probability based on training data to have the value false, resulting in a yes vote and allowing the algorithm to finish and 60% probability of having the value true requiring the value weekend, which has 0 cost to finish. Tree 3 depends only on "with family" feature. Therefore, the expected cost of the possibility of "watching tv"=false becomes the combined cost of acquiring the sensor data for both "watching tv" and "with family" multiplied with the probability 0.7, equaling 0.7* (100+70).

The expected cost of finishing the algorithm when getting the "watching tv" feature first if its value is "true" has the same cost as the "false" case, since both sensors are required to finish the algorithm with all possible outcomes for the remaining nodes of the trees. The expected cost of this possibility is then the cost multiplied with the probability of the feature having the value true, 0.3. Thus, the total expected cost of getting the sensor data for the "Watching TV" feature is the sum of the two possibilities (0.3+0.7)* (100+70)=170.

The expected cost for getting the sensor data for the other missing feature, Bluetooth scan, is the sum of the expected cost for the possible values of that sensor: if value of "with family" is true (40%) probability, threes 2 and 3 will finish with a no. The algorithm will have the votes yes: 4, no: 5. If the "watching tv" feature has the value false the tree #1 will finish with no. If instead the value is true, then the "with family" node value true will cause the tree to finish with no.

Thus, the "watching TV" feature will not influence the decision in this case, and the expected cost when "with family" is true is 0.4*70.

If on the other hand, the "with family" value is false, the trees 2 and 3 will produce result yes and the algorithm will finish regardless of the decision of the tree 1. This possibility has the probability of 60%. Thus, the total expected cost of finish the algorithm when getting the Bluetooth sensor data first is (0.4+0.6)*70.

The expected cost of getting the Bluetooth sensor data next is lower and therefore the system gets that and finishes the algorithm and with "with family" feature having value False decides to show the notification based on a majority of votes yes: 7, no: 4.

Example 5: Estimating the Error in Inference and its Effect of the Decision

With noisy sensor and feature data, it is unlikely that even well designed domain specific rules will allow inferring features from missing data without any error. For example, if using cached activity data and current charging status to infer the current activity, there will be special cases of the activity changing, in spite of the charging status remaining the same. If 90% of the time the inference is correct, then 10% of the time the system will infer an incorrect activity.

In Table 1, the available features and the effects of inferring a missing feature driving from its past value are shown. Each feature has a corresponding feature weight learned during the training of the model. The features are multiplied with their weights and summed to calculate the probability of the user responding positively to a notification. The partial sum after each feature is shown in the right most column.

The predictive model has a decision threshold of 0.5, above which a notification will be shown. The current values are available for the "morning" and "weekend" features, but missing for the "Driving" feature, which is inferred from the charging sensor value and the past value of driving. When the user has not been driving in the past and the charging has been false, 90% of the time the current value of "driving" has been 0. Processor 102 can calculate the expected impact of the "driving" feature on the result by multiplying the possible values with their probabilities derived from the data and summing them up, as shown in the table. Since the expected impact does not change the decision, it is not necessary to collect its current value and the inferred value can be used.

TABLE 1

Calculating the expected value of missing feature

| Feature name | Value | Weight | Partial result after feature |
|---|---|---|---|
| Morning | 1 | 0.3 | 0.3 |
| Weekend | 1 | 0.3 | 0.6 |
| Driving | 0.9 * 0 + 0.1 * 1 = 0.1 | −0.5 | 0.6 − 0.05 = 0.55 |

Example 6: Probability of Erroneous Inference

Inferring features from collected data on the distribution of values for features can introduce errors, when there is no perfect correlation between values. For example, a user watches TV 5% of the time when "at home" is false and "charging" is true. Then, predicting the "watches TV" to be false when "at home" is false and "not charging" is true would have an error rate of 5%. Feature "Driving" on the other hand, would be true 70% of the time and false 30% of the time given the values of "at home" and "charging".

The system uses a linear model, which combines the feature values with weights 0.3 for "at home", 0.4 for "charging", 0.2 for "watching tv", and −0.4 for "driving", and has a threshold of 0.5. Then the partial result with available features becomes 0.4. For the result to be over the threshold, "driving" needs to be false, and "watching tv" true. The probability of this combination occurring based on the data is 0.015. Thus the expected error from inference of the two missing value on predicting that the user will not open the notification is only 1.5%. Processor 102 may use this calculation to determine all sensors that would result in the threshold to be surpassed and then from those sensors choose the sensor with the minimal energy cost.

Example 7

The process can be divided between the mobile device and a server.

Figure 9A:
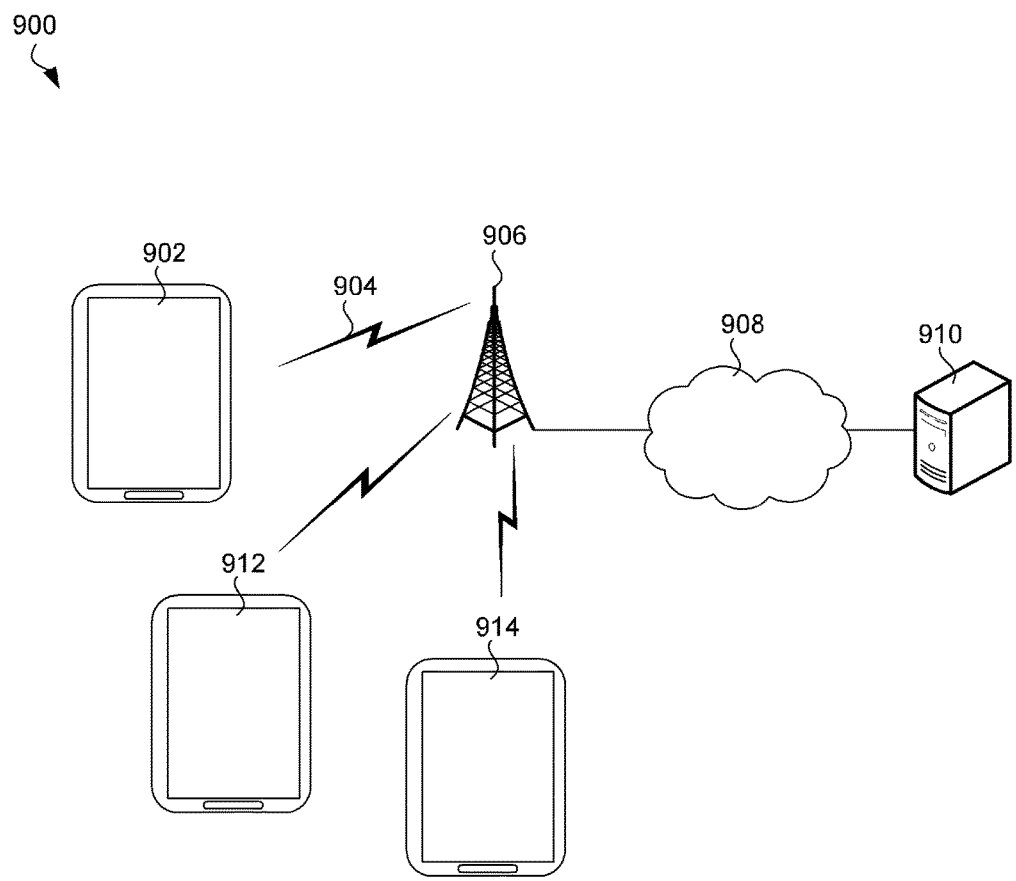
FIG. 9a illustrates a computer network for global-local learning.
Figure 9B:
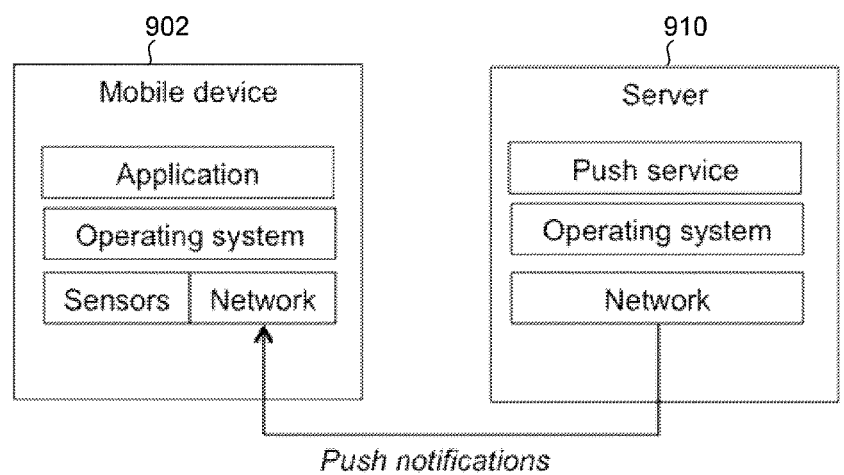
FIG. 9b illustrates the computer network of FIG. 9a more schematically.

FIG. 9a illustrates a computer network 900 for global-local learning while FIG. 9b illustrates computer network 900 more schematically. Network 900 comprises a mobile device 902, which is connected via a wireless data communication 904 to cellular network infrastructure 906 or other wireless network infrastructure, such as managed or unmanaged Wifi hotspots. The network infrastructure 906 is connected via a communication network 908, such as the Internet, to a server 910. The mobile device 902 as well as the server 910 comprise the components as described with reference to FIG. 1 as applicable.

Also with reference to FIG. 4, the prediction and decision steps can be performed either on the mobile device or on a server. In the first case, the whole process can run on the mobile device locally. In the latter case, the collected sensor data is uploaded from the mobile device to the server. The server then performs the prediction and decision steps and informs the device on the result. Further communication between mobile device and the server may be required in the prediction step.

In one example, server 910 performs method 200 in FIG. 2. More particularly, server 910 receives first sensor data generated by the network infrastructure 906, such as the cell in which the mobile device 902 is currently registered. Server 910 then selects sensors based on their energy cost and based on the first sensor data. Server 910 then sends sensor selection data indicative of the one or more selected sensors to the mobile device 902 and receives the sensor data from the mobile device over data network 904 and 908. Server 910 then determines the context and sends context data indicative of the context to the mobile device 902 or performs another action, such as sending a notification message to the device, alerting the user of the device.

In another example, processor 102 of mobile device 902 performs a distributed learning mechanism, which complements the local learning with help from server 910 that aggregates the learning models of multiple mobile devices.

Mobile devices (clients) 902, 912 and 914 send a local user model to server 910 and server 910 calculates a global model for a cluster of users. The global model aggregates the client models, e.g. is an average of them or is calculated in other ways from them. Server 910 sends global model back to clients which combine the global model with their local model.

Clients may be grouped together into clusters based on demographics, content viewing behaviour or similarity of user models. Clients 902, 912 and 914 may include noise in the version of the local model sent to the server. For example, if user model has information of videos liked, noise may be random liking of videos that the user did not view and random unliking of videos that the user liked. Aggregation of models cancels impact of noise on popular videos, but hides privacy sensitive behaviour.

Referring back to FIG. 6, after receiving a push notification from the server, the mobile device 902 performs step 604 and collect the first set of sensor data and upload it to the server. The server 910 then transforms the data into features and perform step 606 to test, if it can evaluate a machine learning model trained on data from that user or a group of users, so that its prediction provides an unambiguous decision with the utility model. If an unambiguous result cannot be calculated even after inference of feature values in step 608, the server 910 sends a request to the mobile device 902 to collect more sensor data as discussed in step 612. The mobile device 902 will then collect the requested sensor data and upload it to the server 910, which will go through another iteration of the process using the additional data.

The context sensors may be divided into synchronous sensors, which need to wake up the device and poll for the value and asynchronous sensors, which report value on change.

The asynchronous features on mobile devices may result in the mobile devices partially awaking (multiple processors: application CPU and other chips). The capture of asynchronous data may wake up the application CPU, e.g. charging of phone. This may result from other services or user using the device (app CPU already awake). Each asynchronous feature results in the value of that feature already existing, the cost becomes 0.

This changes the evaluation order and therefore, processor 102 trains different (instances of) models (e.g. trees) for each asynchronous feature based on the energy cost for each sensor, such as versions of model 700 having different starting nodes 302. Some features have also have side effects, e.g. charging of phone allows treating battery cost of sensors as 0.

Other applications or services may use the values of the context data. These older observations may be cached by the processor 102 on data memory 106. For example WLAN scan results in Android may be cached. Processor 102 can then use the cached values and their "age" in context determination, that is, the evaluation of a context model. Acquiring of the cached features is free (zero cost), if they are available. Processor 102 may cache multiple values for each sensor from different times or only the freshest one. Information gain decreases with age of feature. During the training of the sequential model processor 102 generates the meta-features, each represents feature with an age, each meta feature has an information gain dependent on the underlying feature and the age of the observation. Processor 102 may train separate instances of the model for each meta feature (e.g. a decision tree where second node is 5-10 minutes old WLAN scan.

Cyclical time (month of year, day of week, hour of day, etc.) often has very strong correlation to our activities and it has no collection cost. Therefore, processor 102 can determine its correlation/information gain on a per user basis. Some example training algorithms, such as IDX, CS-ID3 or EG2, would use this feature as the first feature to be collected and evaluated in the model, due to minimal cost. When time is first feature, processor can use it to schedule sequential collection and evaluation of the next features, such as by calculating time for next collection of the next feature(s) in the model.

Processor 102 may determine and use probability of the next feature providing additional information at an interval of time to decide when to collect and evaluate it. Processor 102 may further use historical data to calculate this probability and may bootstrap the process by using average behavioural patterns of all users or a subset of users.

Waiting for "free" context data from other services may allow the processor 102 to avoiding polling these sensors, but has the risk of the other services not asking the data and thus us not detecting the event. Therefore, there is an opportunity cost in not detecting events because of not polling for them at the right time. The opportunity cost can be balanced with the cost of synchronous polling for that event. Processor 102 may use the balancing of the trade-off of these two for tuning the scheduling of context polling. Processor 102 can use the historical information of distribution of the free data and the opportunity cost of missing the event for calculating the schedule.

Figure 10:
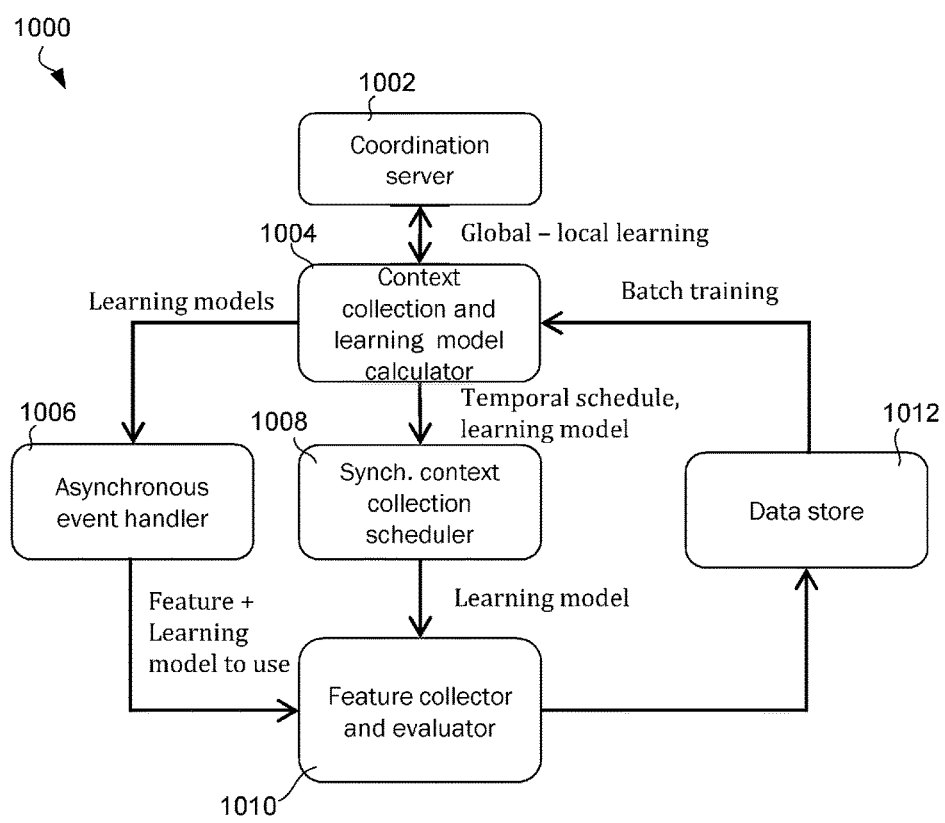
FIG. 10 illustrates a system architecture.

FIG. 10 illustrates a system architecture 1000 comprising multiple modules, such as software modules installed on program memory 104 and executed by processor 102. The architecture comprises a coordination server 1002 that may be located remotely from mobile device 100. The coordination server 1002 is connected to a context collection and learning model calculator 1004, such as over the Internet or a cellular data network. The context collection and learning model calculator provides data to an asynchronous event handler 1006 and a synchronous context collection scheduler 1008, both of which communicated their outputs to a feature collector and evaluator 1010. The feature collector and evaluator 1010 stores the data on data memory 1012 where it is available to the context collection and learning model calculator 1004.

Processor 102 uses asynchronous events to learn the context surrounding interesting events/states, e.g. prefetching opportunities, and to adapt (correct) the behaviour of synchronous context polling. Processor 102 may use randomized synchronous polling for higher frequency events for correcting probabilistic schedule.

Coordination server 1002 and devices 902, 912 and 914 can use global-local learning model for cold starting the device for initial parameters of the collection and learning models and updating the models on the devices.

Figure 11:
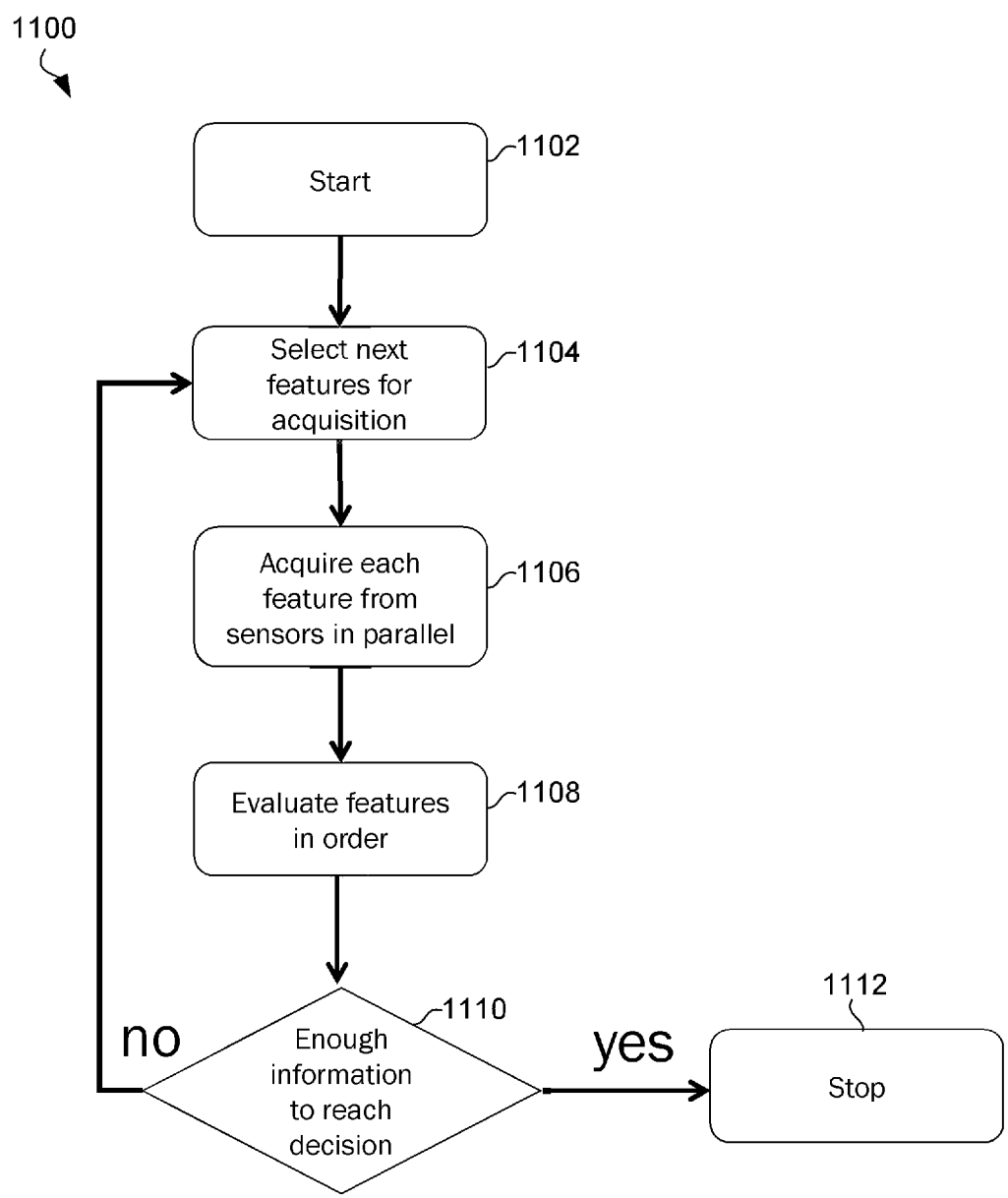
FIG. 11 illustrates a method for parallel feature collection.

FIG. 11 illustrates a method 1100 for parallel feature collection. Processor 1102 commences the method at the start node 1102 and then selects 1104 next features for acquisition as described above. Processor then acquires 1106 each feature from the sensors in parallel, which minimizes the time the device is kept awake. After the acquisition, processor 102 evaluates 1108 the features in order according to tree 300, for example. Processor 102 determines 1110 whether enough information is available. If not enough information is available, processor 102 goes back to step 1104 of selecting more features. Alternatively, if enough information is available, processor 102 stops 1112 the acquisition process and determines the context.

This is particularly useful in cases where acquiring a feature may take time, such as acquiring GPS signal my take several seconds, accelerometer 1-2s, Cell id:0s. Keeping device awake for the required time consumes battery. If the cost of acquiring feature is low compared to the cost of keeping the device awake and the probability of using the feature is high, processor 102 acquires the feature out of order.

Many users of current smart phones charge their devices daily and often longer than necessary, so that the battery is never close to running out and reaches 100% level well before charging ends. Processor 102 may leverage this to perform computing and power intensive training of the feature collection and learning algorithms when the device is charging (and the battery is at 100%). Additionally, processor 102 may use algorithms which are very asymmetric in their power use: cheap evaluation combined with much more expensive training, for example decision trees. Combined with low cost feature acquisition, this approach reduces the battery use of learning significantly.

Reducing power of learning on mobile devices through efficient context collection and evaluation allows use of machine learning for new problems by reducing cost of learning, makes machine learning more feasible for background processes. The proposed methods further reduces battery drain of mobile initiated prefetching over WLAN, which may be important for operators and device manufacturers who look at energy budgets of applications.

In one example, processor 102 adapts the collection of data to the patterns in the data and uses temporal patterns for scheduling the waking up the device. Processor 102 may also use charging time of device for power intensive operations such as training of learning algorithm and adaptation of context collection.

The following description provides examples where the determined context is used to decide whether to pre-fetch video content.

Example 8

System has four sensors 1. cyclical time sensor, 2. A/C Charging sensor, 3. WLAN network availability, 4. Cellular network ID. Cyclical time may refer to a time that occurs once within each cycle, such as each week. For example, Monday 10 am is a cyclical time as it occurs once a week. 10 am may be a cyclical time as well as it occurs once a day.

The decision to pre-fetch content over WLAN requires testing if WLAN is available and usable. This is an expensive operation and the system uses two decision tree models instead. Processor 102 constructs the trees in a way, which minimises the feature acquisition (context collection) cost required to reach a decision whether to attempt to pre-fetch a video or not.

The decision tress are constructed using a tree building algorithm, which balances energy cost and information gain. The decision tree building algorithm with use of EG2 node ranking function may be summarised as set out below:
1. begin at the root node,
2. determine the attribute with the highest information gain and lowest cost which is not already used as an ancestor node. This can be calculated according to the EG2 function, which uses the following formula, $(2^{\Delta I_i}-1)/(c(i)+1)^\omega$ where $\Delta I$ is the information gain over node i, $c(i)$ energy cost of node i and $\omega$ is a parameter which balances the effect of cost with the information gain,
3. add a child node for each possible value of that attribute,
4. attach all examples to the child node where the attribute values of the examples are identical to the attribute value attached to the node,
5. if all examples attached to the child node can be classified uniquely add that classification to that node and mark it as leaf node,
6. go back to step two if there are unused attributes left, otherwise add the classification of most of the examples attached to the child node.

Example Past Data

| Cyclical time | A/C | Cell ID | WLAN | Can pre-fetch (Usability) |
|---|---|---|---|---|
| Monday, 11 am | 0 | 01 | Starbucks | yes |
| Monday, 12:05 pm | 0 | 02 | — | no |
| Monday 12:35 | 1 | 03 | Home_wifi | yes |
| Sunday, 3 PM | 0 | 01 | — | no |
| Sunday, 4 PM | 1 | 04 | Public_wifi | no |

Sensor Cost for Polling their Value

| | Cyclical time | A/C | Cell ID | WLAN availability | WLAN usability |
|---|---|---|---|---|---|
| Polling cost when not charging (A/C = 0) | 0 | 3 | 5 | 55 | 40 |
| Cost when charging A/C = 1 | 0 | 0 | 0 | 0 | 0 |
| Cost when receiving asynchronous notification | 0 | 0 | 0 | 0 | 0 |

For the following two cases, a mobile device is listening to A/C charging events and has been pre-programmed to wake up at certain times, when WLAN is likely to be usable.

Case 1:

cyclical time sensor value triggers an event waking up the service. The time sensor (real time clock) of the device hits a value for which an alarm has been programmed for. The alarm wakes up the service and the service gets the time value for zero cost. It then uses a pre-calculated model to decide whether to try prefetching content or not.

The model for case 1 has been calculated (tree constructed) ahead of the time, when the device was charging, by using the cyclical time as the root node of the model (due to zero cost and high information gain) followed by cell id and charging (both have high information gain and low cost). The time would be evaluated when setting the time for the alarm. There are two branches from the time node, one for value Monday 11 am leading to cell id. The other one at 12:35 am leading to A/C charging node. These are the only possible options for this model, since the device has been programmed to only wake up at these two times.

In cell id node, if the cell id matches the value of 01, then WLAN will be activated. If not, prefetching would not be attempted. If WLAN is available and SSID equals "starbucks" (or any of the other SSIDs that have worked in the past), its usability would be tested and prefetching would be attempted.

In charging node, if the device is not charging, the evaluation will stop. If the device is charging, the battery cost of the other sensors would be mitigated by the A/C power and the next node to be checked would be the maximum information value of WLAN availability. In this tree, the followed by a prefetching attempt.

Case 2:

Start of A/C charging wakes up the system providing it with the free root node of A/C power. A second model has been pre-calculated (tree constructed) when the device was charging for this case. The tree has two branches from root node, A/C=1, leading to collection and evaluation of the WLAN SSID and A/C=0, leading to evaluation of cyclical time.

The first branch, A/C=1 uses different costs of 0 for all the sensors, so the highest information gain sensor would be selected to be evaluated next. Since WLAN connectivity and SSID have the largest information gain (i.e. predictive power in determining whether we can prefetch), these would be evaluated and if the device is connected to any WLAN which has ever worked (the cost of trying a new WLAN or an unreliable one would be low) the usability of the WLAN would be tested.

Example 9: Cascaded Models

Processor 102 may first use algorithm A with first sensors and if confidence on prediction result too low, collect second sensors and use algorithm B for collected $1^{st}$ and $2^{nd}$ sensors. A and B can be the same algorithm or different ones. This can have more steps than 2. Confidence values for results can be calculated for many learning algorithms. Many libraries, such as Matlab, can provide this value along with the result. People skilled in the art know how to do this.

Processor 102 configures how the model is (sequence of evaluation) used inside each algorithm (A and B) and selection of sensors used in A versus sensors used in B (semi sequential evaluation). This is selected based on the adapted cost to minimize the total cost.

Past Data

| Cyclical time | A/C | Cell ID | WLAN | Can pre-fetch (Usability) |
|---|---|---|---|---|
| Monday, 11 am | 0 | 01 | Starbucks | yes |
| Monday, 12:05 pm | 0 | 02 | — | no |
| Monday 12:35 | 1 | 03 | Home_wifi | yes |
| Sunday, 3 PM | 0 | 01 | — | no |
| Sunday, 4 PM | 1 | 04 | Public_wifi | no |

Example 8 may be extended by performing prediction of when pre-fetching can be done, if the current time does not provide a good opportunity. Using the same models and values as in example 8, the decision that the prefetching cannot be done would be followed by performing a prediction using a more complex regression algorithm, such as support vector regression learning (SVR) or neural networks to predict when the next prefetching opportunity is likely to occur. All the collected sensor values would then be given as features to the algorithm.

The above methods and systems may have multiple applications in addition to use with predicting when to pre-fetch. This may include predicting the activity of the user, for example, when a user is about to leave for a bus stop and inform the user if the bus is late, and predicting when the user has lost the phone or it has been stolen to ask for a password.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for determining a value indicative of a context of a mobile device, the method comprising:
    activating one or more first sensors of the mobile device by a first process that is a first instance of a first computer program and consuming a first amount of energy, wherein the first process performs operations other than determining the value indicative of the context of the mobile device and stores, in a data store, first sensor data generated by the one or more first sensors upon activation;
    retrieving, by a second process that is a second instance of a second computer program and different from the first process, from the data store and without consuming the first amount of energy, the first sensor data;
    selecting, by the second process, from multiple second sensors of the mobile device one or more second sensors based on the first sensor data and based on an energy cost value associated with each of the multiple second sensors, the energy cost value being indicative of energy consumed when requesting data from each of the multiple second sensors, such that the selection of the one or more selected sensors minimizes energy consumption and maximizes information gain that the one or more selected sensors provide in addition to the first sensor data;
    requesting second sensor data from the one or more selected second sensors to cause the one or more selected second sensors to be activated and consume energy from a battery of the mobile device;
    receiving from the one or more selected sensors the requested second sensor data;
    evaluating a context model for the first sensor data and the second sensor data to determine the value indicative of the context of the mobile;
    receiving user interaction data indicative of whether a user interacts with a notification shown in the context determined by the value indicative of the context;
    repeatedly performing the steps of receiving first sensor data, selecting one or more sensors, requesting second sensor data, receiving the requested second sensor data, determining the context and receiving user interaction data multiple times over a period of time to identify one or more contexts in which the user is likely to interact with a notification;
    performing the steps of receiving first sensor data, selecting one or more sensors, requesting second sensor data, receiving the requested second sensor data and determining the context to determine a current context; and displaying a notification on the mobile device upon determining that the current context is in the one or more identified contexts in which the user is likely to interact with the notification.

2. The method of claim 1, wherein the first sensor data comprises an identification of the one or more first sensors.

3. The method of claim 1, further comprising determining the information gain associated with each of the second set of sensors based on the first sensor data, wherein selecting from multiple second sensors one or more selected sensors comprises selecting from multiple second sensors one or more selected sensors based on the information gain.

4. The method of claim 3, wherein determining the information gain comprises:
evaluating a model using the first sensor data as input data, the model comprising parameters related to the multiple first sensors and the multiple second sensors; and
determining the information gain based on an output of the model.

5. The method of claim 3, wherein selecting from multiple second sensors one or more selected sensors comprises selecting from multiple second sensors one or more selected sensors based on an information threshold.

6. The method of claim 5, further comprising determining a weighted sum based on the first sensor data, wherein selecting from multiple second sensors one or more selected sensors comprises selecting one or more second sensors that are associated with a minimal energy cost while at the same time being associated with an information gain greater than the distance of the weighted sum from the information threshold.

7. The method of claim 5, wherein the information threshold is based on a number of base learners that have reached a decision in an ensemble model and how many base learners still need to reach a decision before the ensemble model can reach a majority vote such that the one or more selected sensors are the sensors which allow the ensemble to reach the decision at an expected lowest energy cost.

8. The method of claim 7, wherein the base learners comprise a random forest or boosted trees.

9. The method of claim 1, wherein receiving the second sensor data comprises:
determining a point in time to retrieve the second sensor data at an optimised energy cost; and
receiving the second sensor data at the point in time.

10. The method of claim 1, wherein receiving from the one or more selected sensors second sensor data comprises receiving from more than one sensors second sensor data in parallel.

11. The method of claim 10, wherein determining the context comprises evaluating a context model using the second sensor data from each of the more than one second sensors sequentially as input data to the context model.

12. The method of claim 1, wherein selecting from multiple second sensors one or more selected sensors comprises selecting from multiple second sensors one or more sensors based on a sensor access model.

13. The method of claim 12, wherein the sensor access model is a decision tree.

14. The method of claim 12, wherein the sensor access model is a cascaded learning method.

15. The method of claim 1, further comprising excluding one or more excluded sensors from the one or more second sensors based on the first sensor data.

16. The method of claim 15, wherein excluding the one or more excluded sensors comprises determining the excluded sensors based on one or more of:
domain knowledge,
database inference, and
context data associated with the mobile device.

17. The method of claim 1, wherein the one or more first sensors are associated with a communications network to which the mobile device is communicatively coupled.

18. The method of claim 1, wherein
selecting the one or more selected sensors comprises sending sensor selection data indicative of the one or more selected sensors to a mobile device,
receiving the second sensor data comprises receiving the second sensor data from the mobile device over a data network, and
determining the context comprises sending context data indicative of the context to the mobile device.

19. The method of claim 1, further comprising waiting for the first sensor data.

20. The method of claim 1, wherein selecting from multiple second sensors one or more selected sensors comprises selecting from multiple second sensors one or more selected sensors based on an age of the first sensor data.

21. The method of claim 1, wherein the first sensor data is indicative of one or more of:
a charging event of a battery of the mobile device; and
a current cyclical time.

22. The method of claim 1, wherein the first sensor data is indicative of a connectivity status change in relation to one or more of:
a Bluetooth device;
a Wifi hotspot; and
a cellular network cell.

23. The method of claim 1, further comprising one or more of:
downloading content item based on the context; and
displaying a notification based on the context.

24. The method of claim 1, further comprising training a context model based on the first sensor data and the second sensor data, wherein determining the context comprises evaluating the context model.

25. A non-transitory computer readable medium with an executable program stored thereon that when executed causes a computer to perform the method of claim 1.

26. A computer system for determining a value indicative of a context of a mobile device, the computer system comprising:
an input data port;
a processor to
activate one or more first sensors of the mobile device by a first process that is a first instance of a first computer program and consuming a first amount of energy, wherein the first process performs operations other than determining the value indicative of the context of the mobile device and stores, in a data store, first sensor data generated by the one or more first sensors upon activation;
retrieve, by a second process that is a second instance of a second computer program and different from the first process, through the input data port from the data store and without consuming the first amount of energy, the first sensor data;
select, by the second process, from multiple second sensors of the mobile device one or more second sensors based on the first sensor data and based on an energy cost value associated with each of the multiple second sensors, the energy cost value being indicative of energy consumed when requesting data from each of the multiple second sensors, such that the selection of the one or more selected sensors minimizes energy consumption and maximizes information gain that the one or more selected sensors provide in addition to the first sensor data;

request second sensor data from the one or more selected second sensors to cause the one or more selected second sensors to be activated by a second process that is a second instance of a second computer program and different to the first process and consume energy from a battery of the mobile device;

receive through the input data port from the one or more selected sensors the requested second sensor data; and evaluating a context model for the first sensor data and the second sensor data to determine the value indicative of the context of the mobile device;

receive user interaction data indicative of whether a user interacts with a notification shown in the determined context;

repeatedly perform the steps of receiving first sensor data, selecting one or more sensors, requesting second sensor data, receiving the requested second sensor data, determining the context and receiving user interaction data multiple times over a period of time to identify one or more contexts in which the user is likely to interact with a notification;

perform the steps of receiving first sensor data, selecting one or more sensors, requesting second sensor data, receiving the requested second sensor data and determining the context to determine a current context; and display a notification on the mobile device upon determining that the current context is in the one or more identified contexts in which the user is likely to interact with the notification.

* * * * *